United States Patent
Lenart et al.

(10) Patent No.: US 6,736,369 B2
(45) Date of Patent: May 18, 2004

(54) ADA METERING FAUCET MECHANISM

(75) Inventors: Robert A. Lenart, Olmsted Falls, OH (US); Todd C. Loschelder, Macedonia, OH (US)

(73) Assignee: Moen Incorporated, N. Olmsted, OH (US)

( * ) Notice: Subject to any disclaimer, the term of this patent is extended or adjusted under 35 U.S.C. 154(b) by 202 days.

(21) Appl. No.: 09/932,715

(22) Filed: Aug. 20, 2001

(65) Prior Publication Data

US 2003/0034473 A1 Feb. 20, 2003

(51) Int. Cl.$^7$ .................... F16K 21/06; F16K 31/48
(52) U.S. Cl. ................ 251/237; 251/54; 4/677
(58) Field of Search ................ 251/231, 236, 251/237, 238, 244; 4/675, 676, 677

(56) References Cited

U.S. PATENT DOCUMENTS

| | | | |
|---|---|---|---|
| 1,444,189 A | * 2/1923 | Key ..................... 251/238 |
| 2,490,726 A | 12/1949 | Bauberger |
| 2,991,795 A | * 7/1961 | Fraser et al. ............ 251/245 |
| 3,168,112 A | 2/1965 | Klingler |
| 3,329,345 A | * 7/1967 | Scott ..................... 251/231 |
| 3,420,272 A | 1/1969 | Corlett |
| 3,943,970 A | 3/1976 | Knapp |
| 4,056,124 A | * 11/1977 | Goldsmith ............. 137/625.17 |
| 4,659,059 A | * 4/1987 | Morris et al. ................. 251/54 |
| 4,698,858 A | * 10/1987 | Kostorz ..................... 4/677 |
| 4,773,571 A | * 9/1988 | Hagan et al. ............ 251/244 X |
| 4,819,909 A | * 4/1989 | Hart et al. ................... 251/48 |
| 5,329,967 A | 7/1994 | Gnauert |
| 5,494,077 A | 2/1996 | Enoki et al. |
| 5,730,176 A | 3/1998 | Heimann et al. |
| 5,960,490 A | * 10/1999 | Pitsch .......................... 4/677 |
| 6,199,586 B1 | 3/2001 | Pawelzik et al. |

* cited by examiner

Primary Examiner—Gene Mancene
Assistant Examiner—Eric Keasel
(74) Attorney, Agent, or Firm—Calfee, Halter & Griswold LLP

(57) ABSTRACT

A metering faucet includes a housing and a faucet metering cartridge positioned within the housing and having an outwardly extending faucet stem which is movable along a stem axis. There is a cartridge cap which is positioned within the housing and has a portion extending over and in contact with the cartridge stem to provide an inward force thereon. A handle is pivotally mounted to the housing on one side of the stem axis, with the handle having a portion which extends through a housing opening to contact the cartridge cap. Upon pivotal movement of the handle, an inward force is applied on the cartridge stem. The handle has a force applying area which extends a substantial distance from the pivotal mounting of the handle and terminates at the diametrical opposite side of the pivotal mounting of the handle.

3 Claims, 1 Drawing Sheet

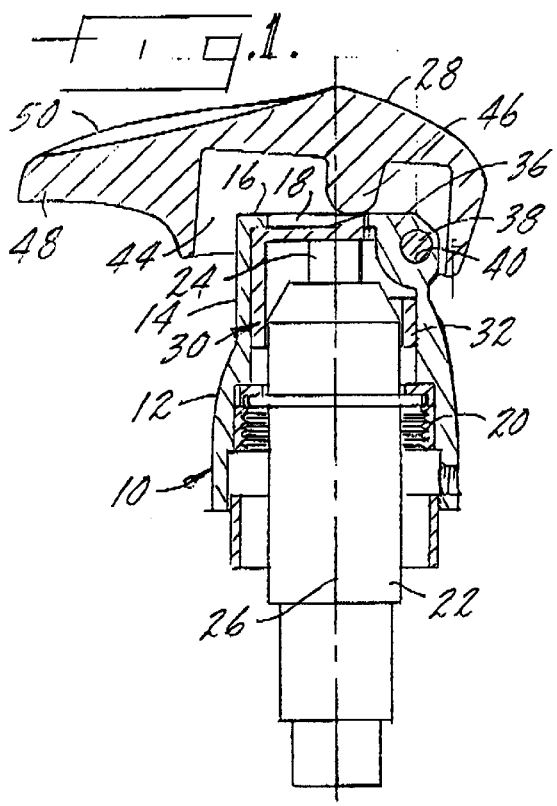
Fig. 1.
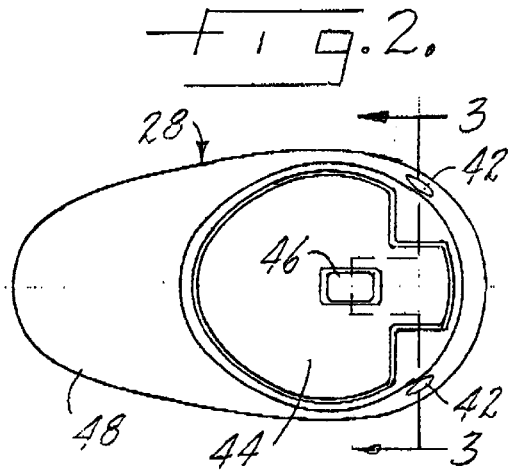
Fig. 2.
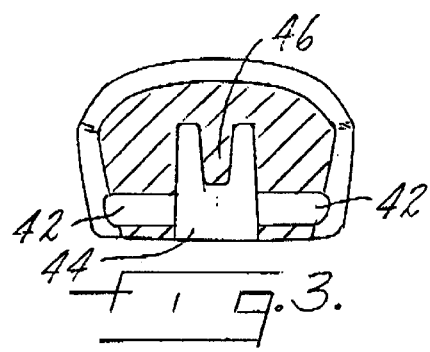
Fig. 3.
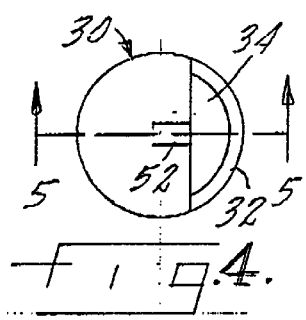
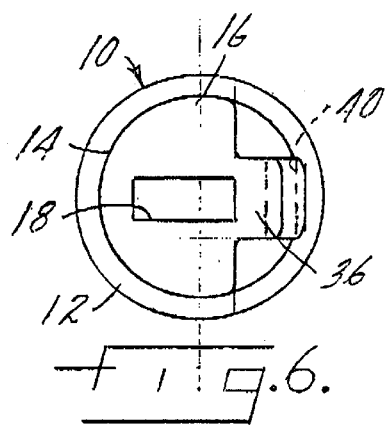
Fig. 6.
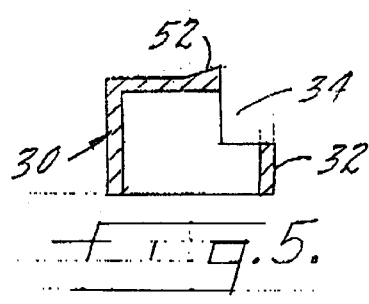
Fig. 4.
Fig. 5.

ADA METERING FAUCET MECHANISM

THE FIELD OF THE INVENTION

The present invention relates to metering faucets of the type commonly found in commercial washrooms, and more specifically, to a metering faucet in which the handle is designed to provide the optimum mechanical advantage for the individual operating the faucet. Many present-day metering faucets of the type commonly found in public washrooms require a substantial application force to cause water to flow from the faucet. To be consistent with the Americans with Disabilities Act, such faucets should provide a handle or lever which minimizes the force required to operate the faucet. The present invention is directed toward that end, and further provides a metering faucet which has minimum components and the optimum mechanical advantage, implemented with an aesthetically pleasing handle style.

SUMMARY OF THE INVENTION

The present invention relates to metering faucets and in particular to such a faucet which has a minimum number of components and the maximum or optimum mechanical leverage for operating the faucet.

A primary purpose of the invention is to provide a faucet as described in which the handle extends a substantial distance from its point of pivotal attachment to maximize the mechanical advantage upon operation of the handle.

Another purpose of the invention is to provide a metering faucet as described which has an aesthetically pleasing handle, but one which utilizes its shape to provide maximum mechanical advantage in operation of the faucet.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a metering faucet as described herein;

FIG. 2 is a bottom view of the faucet handle;

FIG. 3 is a section along plane 3—3 of FIG. 2;

FIG. 4 is a top view of the cartridge cap;

FIG. 5 is a section along plane 5—5 of FIG. 4; and

FIG. 6 is a top view of the faucet housing.

DESCRIPTION OF THE PREFERRED EMBODIMENT

The present invention relates to metering faucets and utilizes a commercially available metering cartridge which is shown in U.S. Pat. No. 4,659,059, which is herein incorporated by reference. This cartridge is sold by Acorn Manufacturing Company under part number 2302-000-003, but the invention should not be limited to this specific type of metering cartridge. What is required is a cartridge which has its own effective return spring or return mechanism.

In the drawings, the faucet housing is indicated generally at 10 and includes a slightly frusto-conical portion 12, with a cylindrical portion 14 at its upper end. The cylindrical portion 14 is covered by a top 16 having a central opening 18. Positioned within the housing 10 and held therein by a cartridge nut 20 is a faucet cartridge 22 having an outwardly-extending axially movable stem 24. The stem 24 will move along an axis 26, as it is operated by the handle 28.

Positioned inside of the cylindrical portion 14 of the housing 10 is a cartridge cap 30 which has a cylindrical wall 32, with a corner opening 34, as particularly shown in FIG. 5. The opening 34 accommodates a boss 36 integrally formed as a part of the housing 10. The cartridge cap is movable within the cylindrical portion 14 of the housing in response to movement of the handle 28.

The handle 28 is pivotally attached to the housing 10 by means of a pin 38 which extends through a bore 40 in the boss 36 and through aligned openings 42 in the handle 28. It should be noted that the pivotal connection of the handle to the housing 10 is on one side of the axis 26 along which the cartridge stem 24 will move during operation of the faucet.

The handle 28 has a cavity 44 within which is positioned a projection 46 which, as shown particularly in FIG. 1, is slightly offset from the axis 26 toward the pivotal connection of the handle to the housing. The upper end of the housing 10 and the boss 36 are partially located within the cavity 44, as particularly shown in FIG. 1.

The handle 28 has a handle extension 48 which extends away from the pivotal connection of the handle to the housing and is diametrically opposed or on the opposite side of the handle pivotal mounting to the housing. This particular configuration of the handle, taken in combination with the slightly offset projection 46, provides maximum leverage when the handle portion 50 is given a downward force to operate the faucet. This provides maximum leverage for the force applied to the handle area 50.

In operation, a force applied in the area 50 will cause the handle to pivot about pin 38 and force the projection 46 to slide upon the upper cam surface 52 at the top of the cartridge cap to apply a downward force to the cartridge stem 24. The cam surface 52 has its highest point or the top of its ramp offset toward the pivotal connection of the handle to maximize the force delivered by projection 46 on the cartridge cap. As the projection 46 slides on the cam surface 52, it will apply sufficient downward force to cause the handle to pivot to a degree about the pin 38 to cause the cartridge stem to move inward. The motion will be reversed when the handle is released and the mechanism within the cartridge provides a return force for the handle. The return force may be from a return spring in the cartridge, fluid under pressure within the cartridge, and inlet water pressure.

Of particular advantage is the relationship between the pivotal mounting of the handle, the extension of the handle force receiving to an area a substantial distance away from that pivotal mounting, and the cooperation between the projection 46, the cam surface on top of the cartridge cap, and the cartridge cap itself. All of these elements, in combination, and in the particular configuration shown and described, are designed to provide the optimum mechanical advantage for operation of the faucet.

Whereas the preferred form of the invention has been shown and described herein, it should be realized that there may be many modifications, substitutions and alterations thereto.

The embodiments of the invention in which an exclusive property or privilege is claimed are as follows:

1. A metering faucet including a housing, a faucet metering cartridge positioned within said housing and having an outwardly-extending faucet stem movable along a stem axis, a cartridge cap positioned within said housing and having a portion extending over and in contact with said cartridge stem to provide an inward force thereon, a handle pivotally mounted to said housing on one side of said stem axis, said handle having a portion thereof, extending through a housing opening, and in contact with said cartridge cap portion to apply, upon pivotal movement of said handle, an inward force on said cartridge stem, said handle having a force applying area, which extends a substantial distance from said pivotal mounting of said handle, and terminates at the diametrical opposite side of the pivotal mounting of said handle, wherein said cartridge cap has a generally cylindrical side wall and a top, with said top lying against said faucet stem, with said cylindrical wall extending along said faucet metering cartridge.

2. The metering faucet of claim 1 wherein said cartridge cap top has a cam surface positioned for contact by a handle projection extending through said housing opening.

3. The metering faucet of claim 2 wherein said cam surface and handle projection are offset from said stem axis toward the pivotal mounting of said handle.

* * * * *